3,232,895
ADHESIVE COMPOSITIONS COMPRISING ETHYLENE/VINYL ACETATE, CHLORINATED PARAFFIN, AND ROSIN

Isabel M. Klein, Buffalo, and Leo W. Tyran, Lewiston, N.Y., assignors to E. I. du Pont de Nemours and Company, Wilmington, Del., a corporation of Delaware
No Drawing. Filed May 26, 1961, Ser. No. 112,757
4 Claims. (Cl. 260—27)

This invention relates to compositions containing ethylene/vinyl acetate copolymers, in particular to such compositions which are formulated to be especially effective as pressure-sensitive adhesives.

Although ethylene/vinyl acetate copolymers have been known for a number of years, they have only recently become of considerable commercial importance, due largely to their outstanding properties as petroleum wax additives. In this application, the ethylene/vinyl acetate copolymer is present in concentrations ranging from about 1 to 60% by weight of the composition. In order for the ethylene/vinyl acetate to be suitable in this broad range of compositions, it is necessary that the wax and ethylene/vinyl acetate copolymer be compatible. One of the primary factors affecting compatibility is the copolymerized vinyl acetate content of the copolymer. At low concentrations of the copolymer in wax, that is, about 1 to 15% by weight, adequate compatibility is generally obtained with copolymers containing from about 15 to 35% by weight of copolymerized vinyl acetate. At higher concentrations, that is, about 20 to 60% by weight, the copolymer should contain about 27 to 33% by weight of vinyl acetate in order to obtain the desired compatibility. Copolymers with this vinyl acetate content are actually preferred for the entire range of wax-copolymer compositions, since even at the low concentrations, the copolymers with 27 to 33% vinyl acetate show outstanding compatibility and adhesion characteristics. While the wax-copolymer compositions are effective as adhesives in heat-seal applications, they show no tackiness at room temperature and thus are not useful as pressure-sensitive adhesives.

Pressure-sensitive adhesive compositions containing ethylene/vinyl acetate copolymers have been disclosed in Watson et al. U.S. Patent 2,485,248 (October 18, 1949). These compositions contain a tackifier such as octadecanediol diacetate in addition to the ethylene/vinyl acetate copolymer. According to Watson et al., the mole ratio of ethylene to vinyl acetate in the copolymer should not be greater than 5:1, thus the minimum vinyl acetate content is 38% by weight. The preferred copolymers have an ethylene to vinyl acetate mole ratio of 2:1 to 4:1 which corresponds to a vinyl acetate content of 43 to 60% by weight. While the pressure-sensitive adhesives made according to this patent are entirely satisfactory, it is obvious that the ethylene/vinyl acetate copolymers which are especially adapted to use in wax compositions are not suitable as components of the pressure-sensitive adhesives of the patent.

It is accordingly the object of this invention to provide new ethylene/vinyl acetate copolymer compositions which are especially valuable as pressure-sensitive adhesives. A further object is to prepare such compositions with those ethylene/vinyl acetate copolymers which are especially useful in wax compositions. A still further object is to provide pressure-sensitive adhesives which adhere to a wide variety of substrates.

These objects are accomplished by providing compositions consisting essentially of (a) 15 to 50% by weight of an ethylene/vinyl acetate copolymer containing 15 to 35% by weight of copolymerized vinyl acetate, (b) 20 to 60% by weight of a liquid chlorinated hydrocarbon selected from the group consisting of chlorinated paraffin waxes and chlorinated biphenyls, and (c) 20 to 60% by weight of a tackifying resin selected from the group consisting of wood rosin, stabilized rosins and esters thereof with ethylene glycol, polyethylene glycols, glycerol and pentaerythritol.

The ethylene/vinyl acetate copolymers suitable for use in our compositions contain 15 to 35% by weight of copolymerized vinyl acetate, and preferably 27 to 33%. The copolymers having an inherent viscosity of 0.45–1.50 as determined with 0.25% of the copolymer in toluene at 30° C. are suitable and those having an inherent viscosity of 0.6–1.2 are preferred. Copolymers with an inherent viscosity higher than 1.5 are difficult to prepare under commercially practical conditions, while copolymers with a viscosity below 0.45 are too low in molecular weight for most uses. The melt index of preferred copolymers, as determined by the tentative ASTM test method D1238–52T (ASTM Standards, 1955, Part 6, pp. 292–295), falls within the range of about 0.1 to 200.

Copolymers of ethylene and vinyl acetate suitable for use in our compositions can be prepared by methods well known in the art. Thus, the procedures described in U.S. Patent 2,200,429 or 2,703,794 may be used. In addition to two-component ethylene/vinyl acetate copolymers, copolymers of ethylene and vinyl acetate containing small amounts, of the order of 0.001 to 3% by weight, of a third or fourth comonomer, are also suitable for use in our compositions. It is only necessary that the ethylene content of the copolymer be at least 65% by weight, and the vinyl acetate content, at least 15% by weight. Thus, copolymers with small amounts of adhesion-promoting monomers such as acrylic acid, methacrylic acid, itaconic acid, acrylamide, $\beta$-dimethylaminoethyl methacrylate, $\beta$-hydroxyethyl acrylate and other monomers having carboxyl, amido, amino or hydroxyl groups may be used in our compositions. The copolymer may also contain a polyunsaturated monomer, such as diallyl maleate, diallyl phthalate, diallyl ether, ethylene glycol dimethacrylate, etc., which in small amounts can be used to give a controlled amount of cross-linking and thus lower the melt index without leading to insolubilization of the copolymer.

The chlorinated hydrocarbons which can be used in our compositions include the liquid chlorinated paraffin waxes and the liquid chlorinated biphenyls. The chlorinated paraffin waxes which are suitable contain an average of from about 30 to about 50% by weight of chemically combined chlorine and the preferred materials are those containing 40 to 50% chlorine. Chlorinated paraffin waxes are mixtures and their chemical composition depends on the nature of the paraffin wax and the extent and uniformity of the chlorination. Typical simple formulas which approximate average overall compositions may be represented as follows:

$C_{20}H_{37}Cl_5$ (molecular weight, about 460; chlorine content, about 40%)

$C_{25}H_{46}Cl_6$ (molecular weight, about 560; chlorine content, about 40%)

$C_{24}H_{43}Cl_7$ (molecular weight, about 580; chlorine content, about 43%)

$C_{25}H_{43}Cl_9$ (molecular weight, about 660; chlorine content, about 50%).

The pure compounds formed by chlorination of biphenyl are crystalline; however, mixtures of these compounds containing an average of about 30 to 55% chlorine are liquids and are suitable for use in our compositions.

The tackifying agents which are suitable in our compositions are wood rosin, stabilized rosins and esters thereof with polyhydroxy compounds such as ethylene glycol, di- or triethylene glycol, glycerol or pentaerythritol. The suitable stabilized rosins include hydrogenated rosin, polymerized rosin and dehydrogenated rosin. Specific esters which can be used include the glycerol, ethylene glycol, diethylene glycol, and pentaerythritol esters of rosin; the ethylene glycol and glycerol esters of polymerized rosin; and the ethylene glycol, diethylene glycol, triethylene glycol, glycerol and pentaerythritol esters of hydrogenated rosin.

The compositions of this invention can be prepared in a number of ways, for example, by dissolving the ingredients in a mutual solvent such as toluene or carbon tetrachloride, or by mixing hot melts of the ingredients. Other methods will be apparent to those skilled in the art. The compositions containing a volatile solvent can be applied to any thin sheet material as a backing and the solvent evaporated to form the adhesive sheet, tape or the like. The compositions may also be applied in the form of a hot melt. In certain instances as is known in the art, instead of applying the compositions directly on the sheet material, an intermdiaete water-proofing or adhesion-promoting coating is applied to the sheet material and the pressure-sensitive adhesive then applied to the intermediate coating.

In order to be useful as a pressure-sensitive adhesive, a composition must possess (1) adhesiveness to the substrates on which the pressure-sensitive tape, sheet or the like is to be applied and in addition an even greater adhesion to the backing on which the adhesive is coated; (2) sufficient cohesive strength so that some of the adhesive does not transfer from the backing either to the uncoated side of the backing when the tape is unrolled from a coil or to the substrate when the pressure-sensitive type is removed; (3) retention of adhesiveness and flexibility over a wide range of temperatures (usually 0 to 40° C.); and (4) good aging characteristics, particularly in regard to adhesiveness and flexibility. Our compositions possess all these properties to a remarkable degree and thus are well-suited to use as pressure-sensitive adhesives. The ethylene/vinyl acetate copolymer provides the cohesive strength and excellent low temperature properties required, and the combination of chlorinated hydrocarbon and rosin or rosin derivative provides the adhesiveness or "tack" which is so essential. Since the ethylene/vinyl acetate copolymer contains no unsaturation, it is stable to oxidation and does not degrade on aging. The chlorinated hydrocarbons are likewise stable. Unmodified wood rosins are known to absorb oxygen and in uses where this may present disadvantages, the use of the stabilized rosin derivatives with their greatly improved resistance to oxidation is indicated. Typical antioxidants, such as 2,4,6-trialkylated phenols (e.g. 2,4,6-tri-tertiary-butyl phenol), 4,4'-thio-bis(6-tertiary-butyl m-cresol), butylated hydroxyanisole, and butylated hydroxytoluene, may also be used in stabilizing amounts to improve oxidation resistance of the compositions.

The operative and preferred proportions of the three essential components of our compositions are tabulated below.

|  | Operative, percent by weight | Preferred, percent by weight |
| --- | --- | --- |
| Ethylene/vinyl acetate copolymer | 15-50 | 25 |
| Liquid chlorinated hydrocarbon | 20-60 | 25 |
| Rosin or rosin derivative | 20-60 | 50 |

Within the operative range, the compositions can be formulated to provide the specific properties required for different applications, as will be readily apparent to those skilled in the art. The preferred composition, particularly when the liquid chlorinated hydrocarbon is a chlorinated paraffin wax containing about 40% chlorine, shows a remarkable degree of adhesion to a wide variety of substrates.

The invention is further illustrated by the following examples in which all parts and percentages are on a weight basis.

*Example 1*

The following composition was prepared:

| | Parts |
| --- | --- |
| Ethylene/vinyl acetate copolymer (32% vinyl acetate; melt index 25) | 25 |
| Chlorinated paraffin wax (40% chlorine) | 25 |
| WW wood rosin | 50 |
| Toluene | 100 |

The solution was applied to paper and the toluene solvent was evaporated. The coated paper was extremely tacky and adhered strongly on contact to a wide variety of surfaces including waxed paper, glass, oily glass, aluminum, polypropylene film, polytetrafluoroethylene film, polyethylene terephthalate film, polyethylene, and cellophane. The bonds retained their strength at temperatures below 0° C.

Coating of the composition was applied to the backs of various types of floor tile and the toluene allowed to evaporate. The coated tiles showed strong adhesion to sime- and nonporous surfaces such as wood, slate and sealed concrete.

*Example 2*

The following composition was prepared using the same ingredients as in Example 1:

| | Parts |
| --- | --- |
| Ethylene/vinyl acetate copolymer | 50 |
| Chlorinated paraffin wax | 35 |
| WW wood rosin | 15 |
| Toluene | 100 |

The composition was applied to paper as in Example 1. The coating did not have sufficient tack to be an effective presure-sensitive adhesive.

*Example 3*

The following composition was prepared:

| | Parts |
| --- | --- |
| Ethylene/vinyl acetate copolymer (33% vinyl acetate; melt index 24) | 25 |
| Chlorinated paraffin wax (40% chlorine) | 25 |
| Dehydrogenated rosin | 50 |

The composition was applied as a melt to the pigmented side of sulfite paper (25 lb./ream) and to a 1 mil film of polyethylene terephthalate. The coated paper and film displayed excellent adhesion to a variety of substrates and were fully comparable to commercially available pressure-sensitive adhesive tapes.

Replacement of the dehydrogenated rosin in this example by an equal weight of hydrogenated rosin, polymerized rosin, the glycerol ester of rosin, the pentaerythritol ester of hydrogenated rosin, or the ethylene glycol ester of polymerized rosin gives highly effective pressure-sensitive adhesive formulations.

Replacement of the chlorinated paraffin wax by an equal weight of chlorinated biphenyls containing an average of about 55% chlorine yields compositions with less tack. The tack may be increased by using a larger proportion of chlorinated biphenyls or by utilizing a mixture of chlorinated biphenyls containing less chlorine, for example, about 40% chlorine.

Since the selection of the particular proportions of ingredients will depend on (1) the kind of backing to which the adhesive composition will be applied, that is, whether the backing is paper, cloth, cellophane or some other plastic film, and (2) the substrates on which the adhesive is to be used, it will be understood that the foregoing examples are merely illustrative and that many different em- The embodiments of the invention in which an exclusive property or privilege is claimed are defined as follows:

1. A composition consisting essentially of (a) 15 to 50% by weight of an ethylene/vinyl acetate copolymer, said copolymer containing 15 to 35% by weight of copolymerized vinyl acetate, (b) 20 to 60% by weight of a liquid chlorinated hydrocarbon selected from the group consisting of chlorinated paraffin waxes and chlorinated biphenyls, and (c) 20 to 60% by weight of a tackifying resin selected from the group consisting of wood rosin, hydrogenated rosin, polymerized rosin, dehydrogenated rosin and esters thereof with ethylene glycol, polyethylene glycols, glycerol and pentaerythritol.

2. The composition of claim 1 in which the ethylene/vinyl acetate copolymer contains 27 to 33% by weight of copolymerized vinyl acetate.

3. The composition of claim 2 in which the chlorinated hydrocarbon is a liquid chlorinated paraffin wax containing about 40% by weight of chlorine.

4. A composition consisting essentially of (a) 25% by weight of an ethylene/vinyl acetate copolymer, said copolymer containing 27 to 33% by weight of copolymerized vinyl acetate, (b) 25% by weight of a liquid chlorinated paraffin wax, and (c) 50% by weight of a tackifying resin selected from the group consisting of wood rosin, hydrogenated rosin, polymerized rosin, dehydrogenated rosin and esters thereof with ethylene glycol, polyethylene glycols, glycerol and pentaerythritol.

References Cited by the Examiner

UNITED STATES PATENTS

| | | | |
|---|---|---|---|
| 2,096,110 | 10/1937 | Kittredge et al. | 260—33.8 |
| 2,211,689 | 8/1940 | Dittmar | 260—27 |
| 2,485,248 | 10/1949 | Watson et al. | 260—27 |
| 2,490,536 | 12/1949 | Murhy et al. | 260—87.3 |
| 2,490,550 | 12/1949 | Sermattei | 260—27 |
| 3,025,167 | 3/1962 | Butler | 106—230 |
| 3,117,100 | 1/1964 | Cox et al. | 260—27 |

OTHER REFERENCES

Delmonte: "The Technology of Adhesives," 1947, Reinhold Publishing Corp., pages 202 and 294.

Delmonte: The Technology of Adhesives, 1949, Reinhold Publishing Corp., page 202.

LEON J. BERCOVITZ, *Primary Examiner.*

MILTON STERMAN, LOUISE P. QUAST, *Examiners.*